(12) United States Patent
Goss

(10) Patent No.: US 9,651,169 B1
(45) Date of Patent: May 16, 2017

(54) HOSE GRIP

(71) Applicant: Daniel Goss, Madison, MS (US)

(72) Inventor: Daniel Goss, Madison, MS (US)

( * ) Notice: Subject to any disclaimer, the term of this patent is extended or adjusted under 35 U.S.C. 154(b) by 0 days.

(21) Appl. No.: 15/196,130

(22) Filed: Jun. 29, 2016

(51) Int. Cl.
*B65G 7/12* (2006.01)
*F16L 3/00* (2006.01)
*B05B 15/06* (2006.01)

(52) U.S. Cl.
CPC .......... *F16L 3/003* (2013.01); *B05B 15/061* (2013.01); *B65G 7/12* (2013.01)

(58) Field of Classification Search
CPC .......... B65G 7/12; A62C 33/04; F16L 3/1211; F16L 3/10
USPC ............. 248/75, 76; 294/15, 16, 26, 62, 106
See application file for complete search history.

(56) References Cited

U.S. PATENT DOCUMENTS

| | | | |
|---|---|---|---|
| 4,470,177 A * | 9/1984 | Ganung | A62C 33/04 24/270 |
| 4,575,142 A | 3/1986 | Parker | |
| 4,655,492 A | 4/1987 | Landry | |
| 4,723,800 A * | 2/1988 | Sanders | B25B 5/147 294/106 |
| 4,856,834 A | 8/1989 | Lancaster et al. | |
| 5,136,757 A * | 8/1992 | Labonville | F16L 3/003 24/270 |
| 5,979,840 A | 11/1999 | Hollister et al. | |
| 6,447,033 B1 | 9/2002 | Konczak | |
| 7,070,218 B2 | 7/2006 | Berclaw | |
| 7,275,777 B1 | 10/2007 | Urdiales | |
| 7,730,588 B1 * | 6/2010 | Bernier | A62C 33/04 16/422 |
| 8,056,947 B2 * | 11/2011 | Davidson | E21B 19/14 294/106 |
| 8,066,312 B2 | 11/2011 | Padilla | |
| 8,348,317 B1 | 1/2013 | Bird | |
| 9,248,967 B1 * | 2/2016 | Gregg | B65G 7/12 |
| 2015/0265863 A1 | 9/2015 | King | |

* cited by examiner

*Primary Examiner* — Todd M Epps
(74) *Attorney, Agent, or Firm* — David J. Kreher

(57) ABSTRACT

A hose handle that is a more convenient and comfortable way to hold a hose, which can be easily attached and removed to allow easy hose handler substitution, and that does not move along the length of the hose after being attached.

4 Claims, 4 Drawing Sheets

HOSE GRIP

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

This disclosure relates hose handle that can be easily attached and removed from a hose, allows the user to more conveniently and comfortably hold the hose, an which does not move backward along the hose over time as fluid passes through the hose.

BACKGROUND OF THE INVENTION

Hoses of a diameter greater than 1 inch are difficult to handle by one person and thus require a collection of hose handlers. The lead hose handler grips the hose in the area of the nozzle and additional hose handlers grip the hose along the hose length, thus making it easier to control the location of the hose and direction of the flow of the fluid coming out of the hose. However, gripping the hose along the hose length can be strenuous or awkward. Over long periods of time the difficulties of holding the hose are exasperated and there is a need to change out the hose handlers.

Attempts have been made create a device to allow for a more convenient and comfortable way to hold a hose also that allows easy hose handler substitution. These devices wrap around a hose with a handle attached. However, these devices fail to compensate for the additional problem that the fluid pressure going through the hose causes the attached devices not to remain in spot it was originally attached along the hose and for the device to be pushed back along the length of the hose.

What is needed is hose handle that is a more convenient and comfortable way to hold a hose, which can be easily attached and removed to allow easy hose handler substitution, and that does not move along the length of the hose after being attached.

AMENDED SUMMARY OF THE INVENTION

The present disclosure reveals a hose handle with a main body and handle. A first part of the main body and a second part of the main body are connected along a first edge by a plurality of hinges and the first part and second part can be joined together by a plurality of closing apparatus wherein each of the closing apparatus in the plurality of closing apparatus may be but is not limited to a latch, clasp, buckle, snap, or Velcro.

The interior of the main body further comprises a plurality of grips such that, when the main body is closed around a hose, the plurality of grips prevent the hose handle from being forced back along the length of the hose by a fluid that creates backward pressure as the fluid passes through the hose.

In one embodiment of the plurality of grips, each of the grips in the plurality of grips comprises a series of ridges angled in such a fashion as to prevent the hose handle from being forced back along the length of the hose by the fluid as it creates backward pressure as it passes through the hose.

In a second embodiment of the plurality of grips, each of the grips in the plurality of grips comprises an angled base with a thicker end and a thinner end, and a series of ridges. The angled base is angled along what would be the length of the hose, with the thicker end of the angled bases in the upstream direction of fluid flow and the thinner end in the downstream direction of fluid flow and wherein the series of ridges angled in such a fashion as to prevent the hose handle from being forced back along the length of the hose by the fluid as it creates backward pressure as it passes through the hose.

In a third embodiment of the plurality of grips, each of the grips in the plurality of grips comprises an angled base with a thicker end and a thinner end and a series of ridges. The angled base is angled along what would be the length of the hose, with the thicker end of the angled bases in the upstream direction of fluid flow and the thinner end in the downstream direction of fluid flow and wherein the series of ridges angled in such a fashion as to prevent the hose handle from being forced back along the length of the hose by the fluid as it creates backward pressure as it passes through the hose. Further, each grip is a free moving block capable of moving along a path parallel the hose length and attached to a retraction means, wherein the retraction means can be made up of but is not limited to a spring or elastic band, such that, as the fluid pressure attempts to push the hose handle back along the length of the hoses, each of the grips in the plurality of grips moves along the path parallel to the hose length, gripping the hose tighter, while the hose handle remains in its original location.

DETAILED DESCRIPTION OF THE INVENTION

Figure 1:
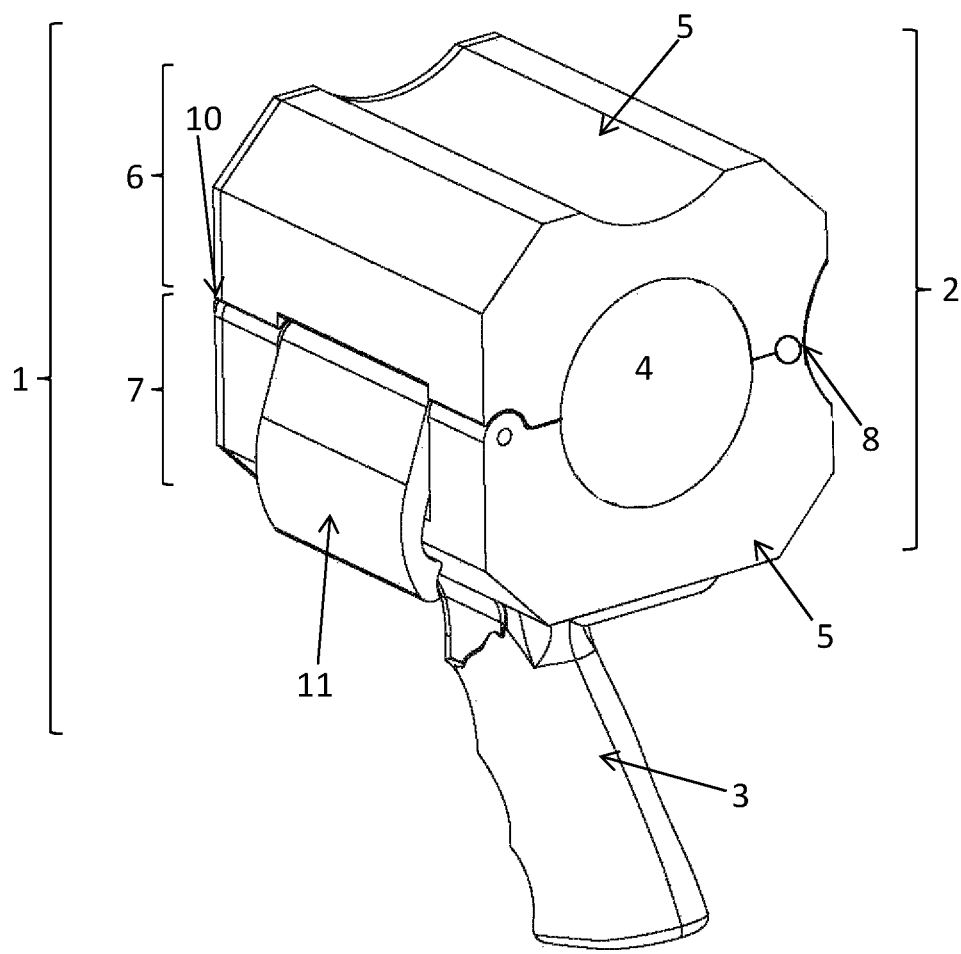
FIG. 1 is a view of the hose handle including the main body, the exterior of the main body, the handle, the plurality of hinges and the plurality of closing apparatus.
Figure 2:
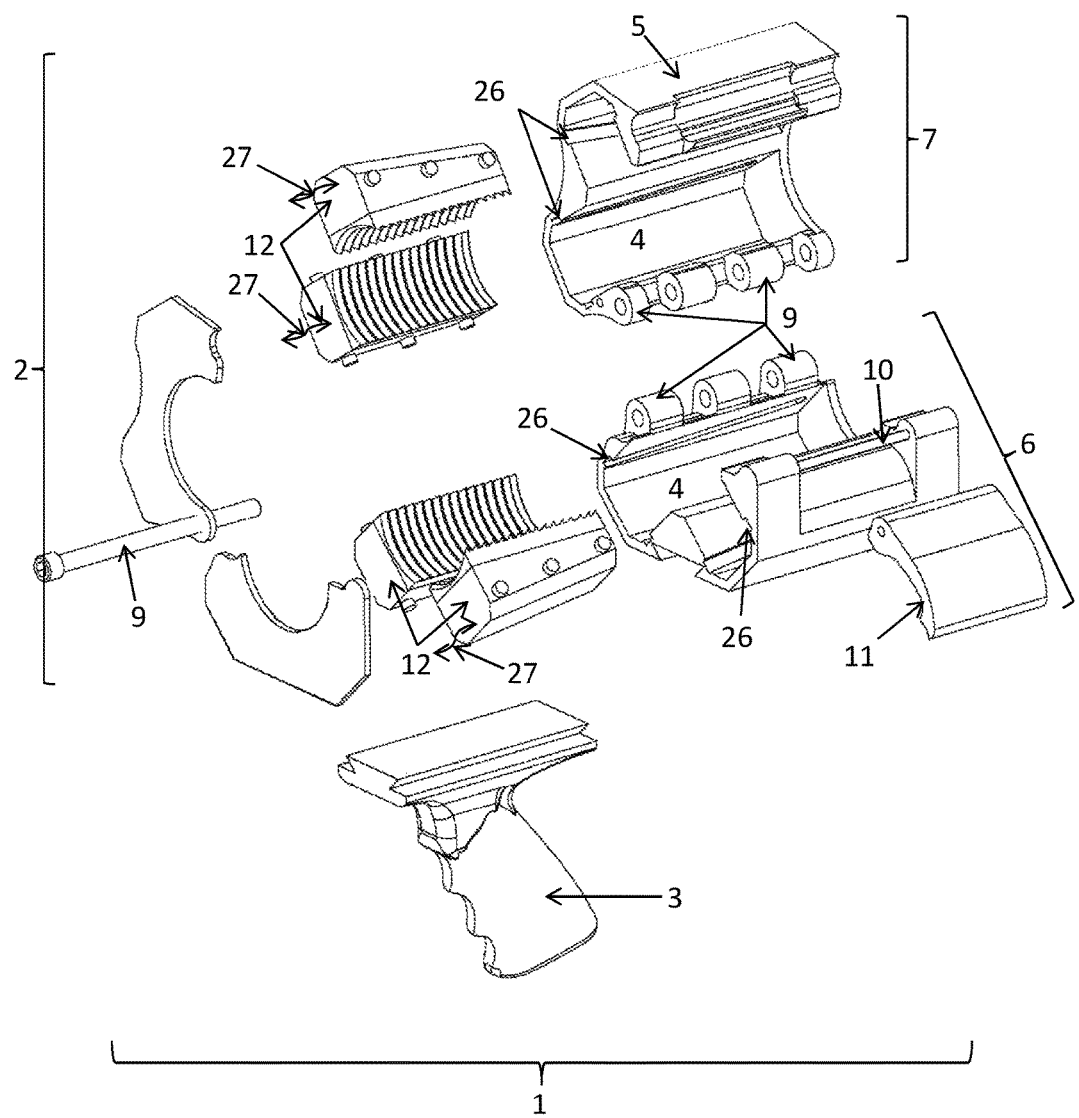
FIG. 2 is a view of the hose handle opened to display the interior of the main body, further indicating the plurality of hinges, the plurality of closing apparatus, and the plurality of grips.
Figure 3A:
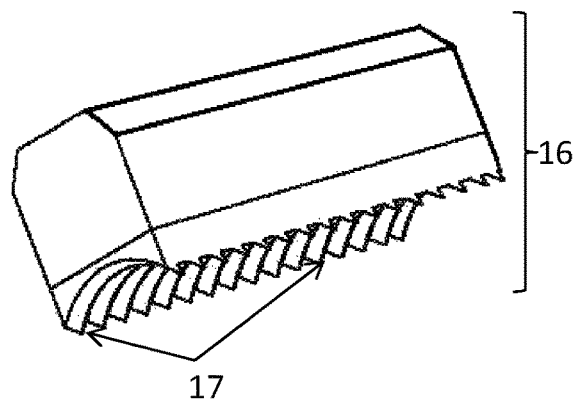
FIG. 3A is a view of the first embodiment of the plurality of grips.
Figure 3B:
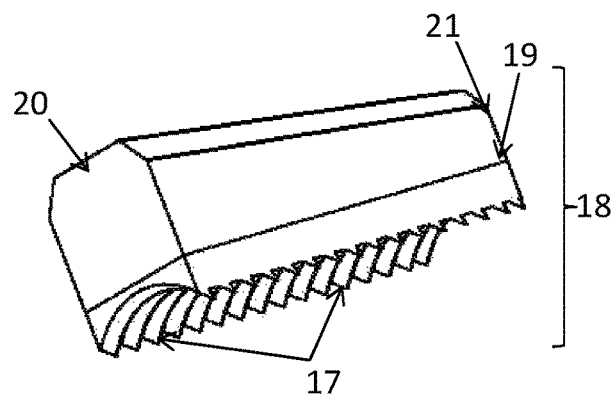
FIG. 3B is a view of the second embodiment of the plurality of grips.
Figure 3C:
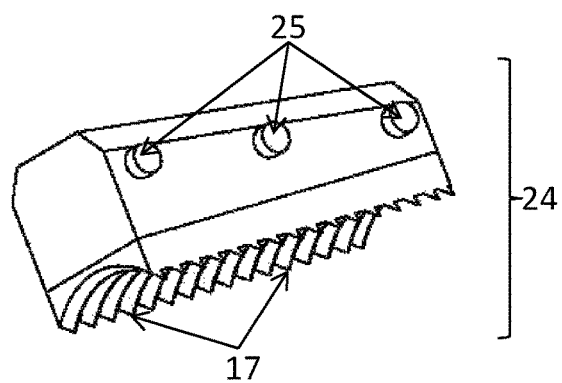
FIG. 3C is a view of the third embodiment of the plurality of grips.
Figure 4:
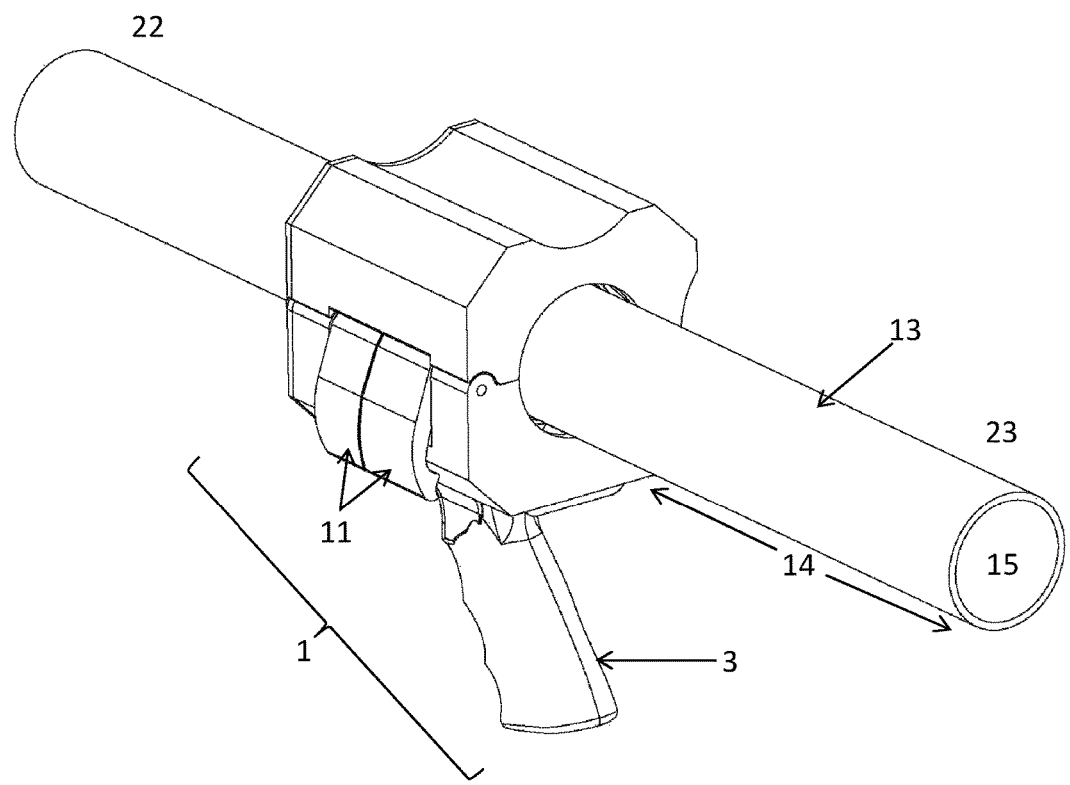
FIG. 4 is a pictorial of the hose handle attached to a hose.

The present disclosure reveals a hose handle 1 with a main body 2 and handle 3. The main body 2 comprises an interior 4 and an exterior 5, and further comprises a first part 6 and a second part 7. The first part 6 of the main body 2 and the second part 7 of the main body 2 are connected along a first edge 8 by a plurality of hinges 9. The first part 6 of the main body 2 and the second part 7 of the main body 7 can be joined along a second edge 10 by a plurality of closing apparatus 11 wherein each of the closing apparatus 11 in the plurality of closing apparatus 11 may be but is not limited to a latch, clasp, buckle, snap, or Velcro. The handle 3 is attached to the exterior 5 of the main body 2 and extends from main body 2.

The interior 4 of the main body 2 comprises a plurality of grips 12 such that, when the main body 2 is closed around a hose 13, the plurality of grips 12 prevent the hose handle 1 from being forced back along the length 14 of the hose 13 by a fluid 15 that creates backward pressure as the fluid 15 passes through the hose 13.

In the first embodiment 16 of the plurality of grips 12, each of the grips 12 in the plurality of grips 12 comprises a series of ridges 17 angled in such a fashion as to prevent the hose handle 1 from being forced back along the length 14 of the hose 13 by the fluid 15 as it creates backward pressure as it passes through the hose 13.

In the second embodiment 18 of the plurality of grips 12, each of the grips 12 in the plurality of grips 12 comprises an angled base 19 with a thicker end 20 and a thinner end 21, and a series of ridges 17. The angled base 19 is angled along what would be the length 14 of the hose 13, with the thicker end 20 of the angled base 19 in the upstream direction 22 of fluid flow and the thinner end 21 in the downstream direction 23 of fluid flow and wherein the series of ridges 17 are angled in such a fashion as to prevent the hose handle 1 from being forced back along the length 14 of the hose 13 by the fluid 15 as it creates backward pressure as it passes through the hose 13.

In the third embodiment 24 of the plurality of grips 12, each of the grips 12 in the plurality of grips 12 comprises an angled base 19 with a thicker end 20 and a thinner end 21 and a series of ridges 17. The angled base 19 is angled along what would be the length 14 of the hose 13, with the thicker end 20 of the angled base 19 in the upstream direction 22 of fluid flow and the thinner end 21 in the downstream direction 23 of fluid flow and wherein the series of ridges 17 are angled in such a fashion as to prevent the hose handle 1 from being forced back along the length 14 of the hose 13 by the fluid 15 as it creates backward pressure as it passes through the hose 13. Further, each grip 12 is a free moving block 25 capable of moving along a path 26 parallel the length 14 of the hose 13 and attached to a retraction means 27, wherein the retraction means 27 can be made up of but is not limited to a spring or elastic band, such that, as the fluid pressure attempts to push the hose handle 1 back along the length 14 of the hose 13, each of the grips 12 in the plurality of grips 12 moves along the path 26 parallel to the length 14 of the hose 13, gripping the hose 13 tighter, while the hose handle 1 remains in its original location.

What is claimed:

1. A hose handle that provides a more convenient and comfortable way to hold a hose, which can be easily attached and removed from the hose to allow easy hose handler substitution, and that does not move along the hose after being attached, wherein the hose comprises a length, an upstream direction and a downstream direction, wherein fluid travels through the hose along a path from the upstream direction to the downstream direction, and the fluid eventually exits the hose, and wherein the hose handle comprises:
    a main body and a handle;
    the main body comprises an interior and an exterior, and further comprises a first part and a second part;
    the first part of the main body and the second part of the main body are connected along a first edge by a plurality of hinges;
    the first part of the main body and the second part of the main body can be joined along a second edge by a plurality of closing apparatus;
    the handle is attached to the exterior of the main body and extends from the main body;
    the interior of the main body comprises a plurality of grips.

2. The hose handle of claim 1 wherein each grip in the plurality of grips comprises a series of ridges angled in such a fashion as to prevent the hose handle from being forced back along the length of the hose by the fluid as the fluid creates backward pressure as the fluid passes through the hose.

3. The hose handle of claim 1 wherein each grip in the plurality of grips comprises an angled base with a thicker end and a thinner end, and a series of ridges; and
    wherein the angled base is angled along what would be the length of the hose, with the thicker end of the angled base in the upstream direction of fluid flow and the thinner end in the downstream direction of fluid flow and wherein the series of ridges are angled in such a fashion as to prevent the hose handle from being forced back along the length of the hose by the fluid as the fluid creates backward pressure as the fluid passes through the hose.

4. The hose handle of claim 1 wherein each grip in the plurality of grips comprises an angled base with a thicker end and a thinner end and a series of ridges;
    wherein the angled base is angled along what would be the length of the hose, with the thicker end of the angled base in the upstream direction of fluid flow and the thinner end in the downstream direction of fluid flow and wherein the series of ridges are angled in such a fashion as to prevent the hose handle from being forced back along the length of the hose by the fluid as the fluid creates backward pressure as the fluid passes through the hose; and
    each grip is a free moving block capable of moving along a path parallel the length of the hose and attached to a retraction mechanism, wherein the retraction mechanism can be made up of but is not limited to a spring or elastic band, such that, as fluid pressure attempts to push the hose handle back along the length of the hose, each of the grips in the plurality of grips moves along a path parallel to the length of the hose, gripping the hose tighter, while the hose handle remains in its original location.

* * * * *